UNITED STATES PATENT OFFICE.

TITUS S. CHURCH, OF BOSTON, MASSACHUSETTS.

IMPROVEMENT IN PROCESSES FOR DESTROYING VERMIN.

Specification forming part of Letters Patent No. 194,861, dated September 4, 1877; application filed April 30, 1877.

*To all whom it may concern:*

Be it known that I, TITUS S. CHURCH, of Boston, in the county of Suffolk and State of Massachusetts, have invented an Improved Method of Killing Vermin, of which the following is a specification:

This invention relates to a method of killing vermin in furniture, bedding, upholstery, carpets, woolen articles, furs, &c.

In the Patent No. 161,864, granted to me, to which reference may be had, I described the use of naphtha as a means for exterminating moths and other insects inhabiting furniture, bedding, carpets, &c., or articles containing wool or hair. I have found by experience that naphtha used in very cold or freezing weather, or placed in contact with frozen moths, does not penetrate into their bodies, and moths treated with naphtha under such conditions are not killed, but will come to life, and become active when exposed to a warm atmosphere. The moths are certainly killed if they are not frozen when the naphtha touches them. If they are frozen, the naphtha, being also cold, has no tendency to thaw them, and fails to penetrate their bodies.

To render the extermination of moths and their eggs certain in cold weather, I have discovered that it is important to warm the naphtha sufficiently to thaw the moths, for it will not penetrate and destroy them when they are rigid with cold.

My improvement therefore consists in the use of warm naphtha for this purpose.

In the practice of this invention, I find that I am enabled to work more rapidly, even in summer, if the naphtha is warm.

In the naphtha-tank containing the articles to be treated to destroy vermin, as in my former patent, I arrange a coil or series of steam-pipes, connecting the pipes with a steam-generator sufficiently remote from the tank to prevent danger of accident from the fire used to raise the steam, and I force steam through such pipes until the naphtha is raised to a temperature about 90° to 100° Fahrenheit, at which stage moths thawed out are thoroughly and quickly exterminated.

This warm naphtha acts in a like manner upon other vermin liable to changes under the action of cold weather.

I do not claim the use of naphtha for extracting oil or grease from fibrous material and fabrics.

I claim—

The described process of exterminating vermin in, and treating, furniture, upholstery, bedding, and articles containing wool and hair, consisting in subjecting such articles to a bath of warm naphtha, substantially as described.

In testimony whereof I have signed my name to this specification in the presence of two subscribing witnesses.

TITUS S. CHURCH.

Witnesses:
G. W. GREGORY,
W. J. PRATT.